United States Patent [19]

Pandl et al.

[11] Patent Number: 5,041,540
[45] Date of Patent: Aug. 20, 1991

[54] COPPER FORMAZAN REACTIVE DYES HAVING HALOTRIAZINE RING

[75] Inventors: Klaus Pandl, Ludwigshafen; Manfred Patsch, Wachenheim, both of Fed. Rep. of Germany

[73] Assignee: BASF Aktiengesellschaft, Ludwigshafen, Fed. Rep. of Germany

[21] Appl. No.: 431,383

[22] Filed: Nov. 3, 1989

[30] Foreign Application Priority Data

Dec. 2, 1988 [DE] Fed. Rep. of Germany ....... 3840653

[51] Int. Cl.$^5$ .................... C09B 62/04; D06P 1/382
[52] U.S. Cl. .................... 534/618; 534/652; 534/887
[58] Field of Search ................. 534/618, 652

[56] References Cited

U.S. PATENT DOCUMENTS

| 3,926,942 | 12/1975 | Yelland | 534/618 |
| 4,507,236 | 3/1985 | Seiler et al. | 534/618 X |
| 4,556,706 | 12/1985 | Hegar et al. | 534/618 |

FOREIGN PATENT DOCUMENTS

| 60-90264 | 5/1985 | Japan | 534/618 |
| 60-215882 | 10/1985 | Japan | 534/618 |
| 62-288661 | 12/1987 | Japan | 534/618 |
| 1389053 | 4/1975 | United Kingdom | 534/618 |
| 1461125 | 1/1977 | United Kingdom | 534/618 |
| 2148921 | 6/1985 | United Kingdom | 534/618 |

Primary Examiner—Mary C. Lee
Assistant Examiner—Fiona T. Powers
Attorney, Agent, or Firm—Oblon, Spivak, McClelland, Maier & Neustadt

[57] ABSTRACT

Novel copper formazan reactive dyes which contain one or two chromophoric radicals derived from a copper formazan of the formula

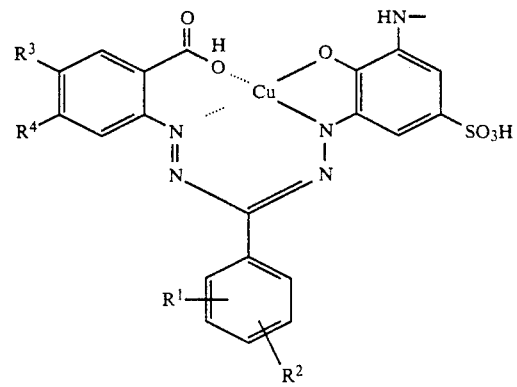

where $R^1$ is hydrogen, hydroxysulfonyl, $C_1$–$C_4$-alkoxy or chlorine, $R^2$ is hydrogen or hydroxysulfonyl and one of the two radicals $R^3$ and $R^4$ is hydrogen and the other is hydroxysulfonyl or, if at least one of the two radicals $R^1$ and $R^2$ is hydroxysulfonyl, $R^3$ and $R^4$ can each at the same time also be hydrogen, and two or three halotriazine radicals as reactive system, and salts thereof, are useful for dyeing or printing hydroxyl- or nitrogen-containing organic substrates.

9 Claims, No Drawings

COPPER FORMAZAN REACTIVE DYES HAVING HALOTRIAZINE RING

The present invention relates to novel copper formazan reactive dyes of the formula I

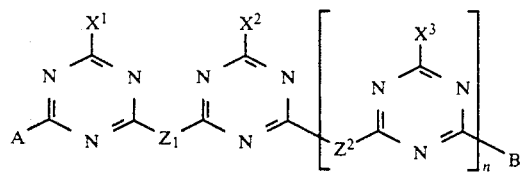

in the form of the free acid or in the form of their salts, wherein n is 0 or 1, $X^1$ and $X^3$ are identical or different, each being independently of the other chlorine or fluorine, $X^2$ is chlorine, and A is a radical of the formula IIa

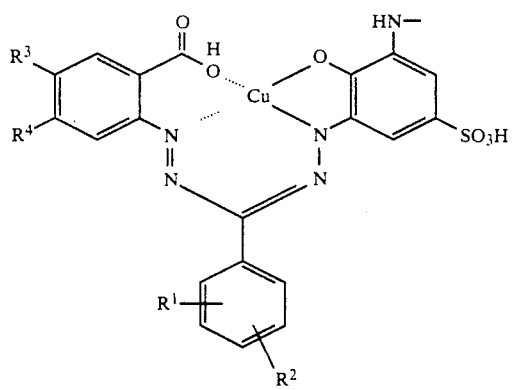

where $R^1$ is hydrogen, hydroxysulfonyl, $C_1$–$C_4$-alkoxy or chlorine, $R^2$ is hydrogen or hydroxysulfonyl and one of the two radicals $R^3$ and $R^4$ is hydrogen and the other is hydroxysulfonyl, or if at least one of the two radicals $R^1$ and $R^2$ is hydroxysulfonyl, $R^3$ and $R^4$ can each at the same time also be hydrogen, or a radical of the formula IIb

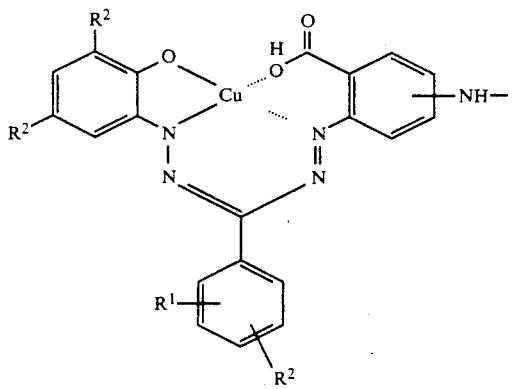

where $R^1$ and $R^2$ are each as defined above, $Z^1$ and $Z^2$ are identical or different, each being independently of the other a radical of the formula III

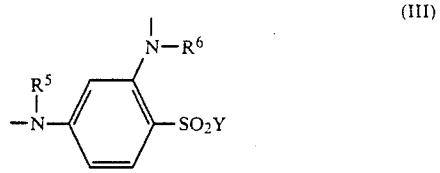

where $R^5$ and $R^6$ are identical or different, each being independently of the other hydrogen or unsubstituted or cyano- or hydroxyl-substituted $C_1$–$C_4$-alkyl and Y is hydroxyl or the radical $NR^7R^8$, where $R^7$ and $R^8$ are identical or different, each being independently of the other hydrogen or unsubstituted or cyano-, hydroxyl- or hydroxysulfonyl-substituted $C_1$–$C_4$-alkyl, or the radicals $R^7$ and $R^8$ together with the nitrogen atom joining them are a 5- or 6-membered heterocycle which may contain further hetero atoms, and B is chlorine, the radical $NR^9R^{10}$, where $R^9$ and $R^{10}$ are identical or different, each being independently of the other hydrogen or unsubstituted or cyano-, hydroxyl- or hydroxysulfonyl-substituted $C_1$–$C_4$-alkyl, or one of the two radicals $R^9$ and $R^{10}$ may also be phenyl which may be substituted by hydroxysulfonyl, sulfamoyl, $C_1$–$C_4$-alkyl, halogen, cyano or $C_1$–$C_4$-alkoxy, or the radicals $R^9$ and $R^{10}$ together with the nitrogen atom joining them are a 5- or 6-membered heterocycle which may contain further hetero atoms, or is the abovementioned radical A, with the proviso that a) $R^5$ and $R^6$ are not both hydrogen, b) when n is 0 and B is A, at least one of the pairs A/B and $X^1/X^2$ is different, c) when n is 1, B is A, and d) $X^2$ may also be fluorine when B is not chlorine.

DE-A-3,434,818 discloses copper formazan reactive dyes with a monochlorotriazine radical as reactive system. However, it has been found that the dyes described therein have inadequate application properties, for example insufficient insolubility in the dyebath, low color strength and inadequate color buildup if used in dyeing processes for medium or deep shades.

Furthermore, earlier applications EP-A-315,046 and EP-A-315,047 describe copper formazan reactive dyes which are structurally similar to the abovementioned dyes of the formula I.

It is an object of the present invention to provide novel reactive dyes based on copper formazans, which should have advantageous application properties.

We have found that this object is achieved by the above-defined copper formazan reactive dyes of the formula I.

If in the formula I B is A, then, unless otherwise stated, the two radicals A which appear in the formula may be identical or different.

$R^1$ is for example methoxy, ethoxy, propoxy, isopropoxy, butoxy, isobutoxy or sec-butoxy.

$R^5$, $R^6$, $R^7$, $R^8$, $R^9$ and $R^{10}$ are each for example methyl, ethyl, propyl, isopropyl, butyl, isobutyl, sec-butyl, 2-cyanoethyl, 2- or 3- cyanopropyl, 1- or 2-cyanoprop-2-yl, 2- or 4-cyanobutyl, 2-hydroxyethyl, 2- or 3-hydroxypropyl or 2- or 4-hydroxybutyl.

$R^7$, $R^8$, $R^9$ and $R^{10}$ are each further for example 2-hydroxysulfonylethyl, 2- or 3-hydroxysulfonylpropyl or 2- or 4-hydroxysulfonylbutyl.

Y and B are each for example amino, mono- or dimethylamino, mono- or diethylamino, mono- or dipropylamino, mono- or diisopropylamino, mono- or dibutylamino, N-methyl-N-ethylamino, mono- or bis(2-cyanoethyl) amino, mono- or bis(2-hydroxyethyl)amino, N-ethyl-N-(2-cyanoethyl)amino, N-ethyl-N-(2-hydroxyethyl)amino, 2-hydroxysulfonylethylamino or N-ethyl-N-(2-hydroxysulfonylethyl)amino.

Y is further for example pyrrolidino, piperidino, morpholino, piperazino or N-($C_1$-$C_4$-alkyl)piperazino such as N-methyl- or N-ethylpiperazino.

B is further for example phenylamino, N-methyl-N-phenylamino, N-ethyl-N-phenylamino, (2-, 3- or 4-hydroxysulfonylphenyl)amino, (2,4- or 2,5-dihydroxysulfonylphenyl)amino, (2- or 3-methyl-4-hydroxysulfonylphenyl)amino, (2,5-dimethyl-4-hydroxysulfonylphenyl)amino, (5-chloro-2-hydroxysulfonylphenyl)amino, (4-methoxy-2-hydroxysulfonylphenyl)amino, (2-methoxy-4-hydroxysulfonylphenyl)amino, (2-chloro-5-hydroxysulfonylphenyl)amino, (2-methyl-5-hydroxysulfonylphenyl)amino, (2-ethyl-5-hydroxysulfonylphenyl)amino, (4-methoxy-3-hydroxysulfonylphenyl)amino, (4-chloro-3-hydroxysulfonylphenyl)amino, (4-methyl-3-hydroxysulfonylphenyl)amino, (2-chloro-3-methyl-5-hydroxysulfonylphenyl)amino, (2-chloro-4-methyl-5-hydroxysulfonylphenyl)amino, 3-sulfamoylphenylamino, 3-(N-methylsulfamoyl)phenylamino, 3-(N-ethylsulfamoyl)phenylamino, 3-(N,N-dimethylsulfamoyl)phenylamino, 3-(N,N-diethylsulfamoyl)phenylamino, 3-[N-(2-hydroxyethyl)sulfamoyl]phenylamino, 3-[N,N-bis(2-hydroxyethyl)sulfamoyl]phenylamino, 3-morpholinosulfonylphenylamino, [3-N-(2-hydroxysulfonylethyl)sulfamoylphenyl]amino, 4-chloro-3-sulfamoylphenylamino, 4-chloro-3-(N-methylsulfamoyl)phenylamino, 4-chloro-3-(N-ethylsulfamoyl)phenylamino, 4-chloro-3-(N,N-dimethylsulfamoyl)phenylamino, 4-chloro-3-(N,N-diethylsulfamoyl)phenylamino, 4-chloro-3-[N-(2-hydroxyethyl)-sulfamoyl]phenylamino, 4-chloro-3-[N,N-bis(2-hydroxyethyl)sulfamoyl]phenylamino, 4-chloro-3-morpholinosulfonylphenylamino, 4-chloro-3-[N-(2-hydroxysulfonylethyl)sulfamoyl]phenylamino, 4-methyl-3-sulfamoylphenylamino, 4-methyl-3-(N-methylsulfamoyl)phenylamino, 4-methyl-3-(N-ethylsulfamoyl)phenylamino, 4-methyl-3-(N,N-dimethylsulfamoyl)phenylamino, 4-methyl-3-(N,N-diethylsulfamoyl)phenylamino, ·4-methyl-3-[N-(2-hydroxyethyl)sulfamoyl]phenylamino, 4-methyl-3-[N,N-bis(2-hydroxyethyl)-sulfamoyl]phenylamino, 4-methyl-3-morpholinosulfonylphenylamino or 4-methyl-3-[N-(2-hydroxysulfonylethyl)sulfamoyl]phenylamino.

Suitable salts of the copper formazan reactive dyes of the formula I are metal and ammonium salts. Metal salts are in particular the lithium, sodium and potassium salts. Ammonium salts for the purposes of the present invention are those salts which have either unsubstituted or substituted ammonium cations. Substituted ammonium cations are for example monoalkyl-, dialkyl-, trialkyl-, tetraalkyl- or benzyltrialkyl-ammonium cations and those cations which are derived from nitrogen-containing 5- or 6-membered saturated heterocycles, such as pyrrolidinium, piperidinium, morpholinium, piperazinium or N-alkyl-piperazinium cations or N-monoalkyl- or N,N-dialkyl-substituted products thereof. Alkyl in this context is in general to be understood as meaning straight-chain or branched $C_1$-$C_{20}$-alkyl which may be substituted by hydroxyl and/or interrupted by oxygen.

Preference is given to copper formazan reactive dyes of the formula I where $Z^1$ and $Z^2$ are each a radical of the formula IIIa

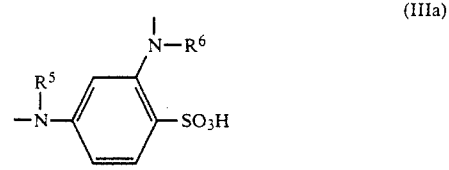

(IIIa)

where $R^5$ and $R^6$ are each independently of the other, hydrogen, methyl or ethyl.

Particular preference is given to copper formazan reactive dyes of the formula I where $Z^1$ and $Z^2$ are each a radical of the formula IIIb

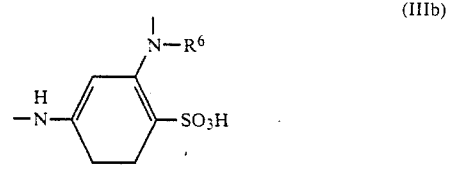

(IIIb)

where $R^6$ is methyl or ethyl.

Very particular preference is given to copper formazan reactive dyes of the formula Ia

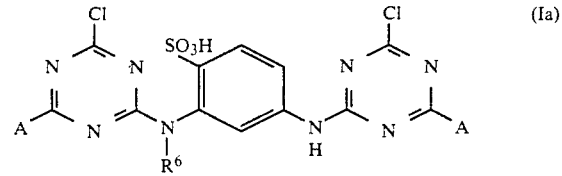

(Ia)

where $R^6$ is methyl or ethyl and each A is as defined above and different from the other A.

Very particular preference is further given to copper formazan reactive dyes of the formula Ib

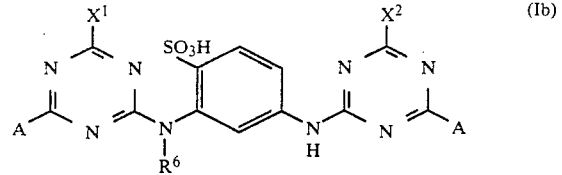

(Ib)

where $R^6$ is methyl or ethyl, one of $X^1$ and $X^2$ is chlorine and the other is fluorine, and each A, which may be identical to or different from the other A, is independently of the other as defined above.

Very particular preference is further given to copper formazan reactive dyes of the formula Ic

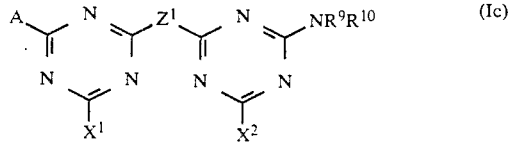

(Ic)

where $Z^1$ is a radical of the formula IIIb

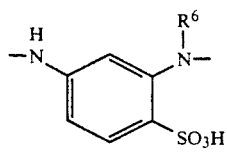

where $R^6$ is methyl or ethyl, $X^1$ and $X^2$ are each independently of the other chlorine or fluorine, and $NR^9R^{10}$ is as defined above.

Very particular preference is further given to copper formazan reactive dyes of the formula Id

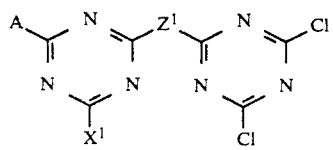

where A is as defined above, $X^1$ is chlorine or fluorine and $Z^1$ is a radical of the formula IIIb

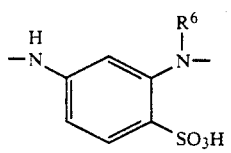

where $R^6$ is methyl or ethyl.

Very particular preference is further given to copper formazan reactive dyes of the formula Ie

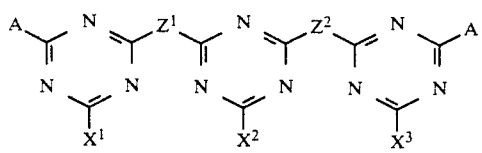

where each A, which may be identical to or different from the other A, is independently of the other as defined above, $X^1$, $X^2$ and $X^3$ are each independently of the others chlorine or fluorine, and $Z^1$ and $Z^2$ are each independently of the other a radical of the formula IIIb

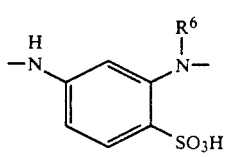

where $R^6$ is methyl or ethyl.

The novel copper formazan reactive dyes of the formula I can be prepared in a conventional manner. For example, dyes of the formula Ia are obtained by reacting cyanuric chloride with a copper formazan dye of the formula IV

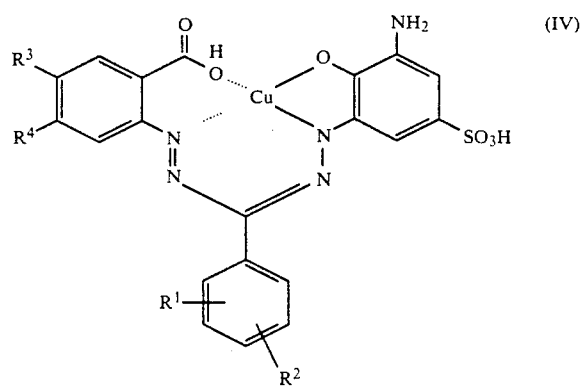

where $R^1$, $R^2$, $R^3$ and $R^4$ are each as defined above, to form a dichlorotriazine dye of the formula V

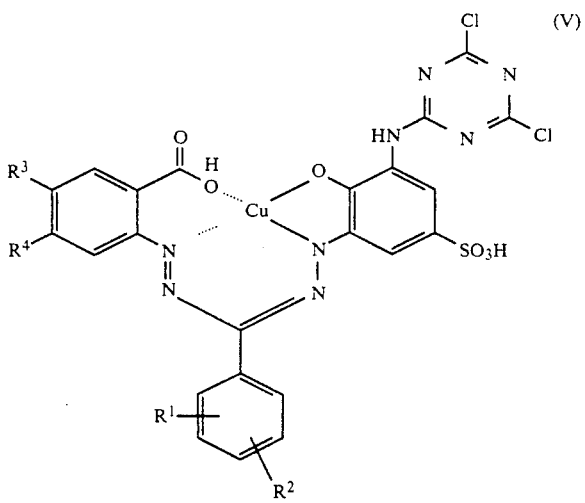

where $R^1$, $R^2$, $R^3$ and $R^4$ are each as defined above, which is then further reacted with a diamine of the formula VI

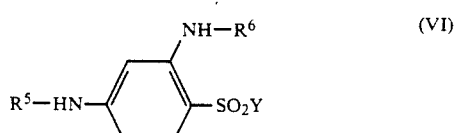

where $R^5$, $R^6$ and Y are each as defined above, to form a dye of the formula VII

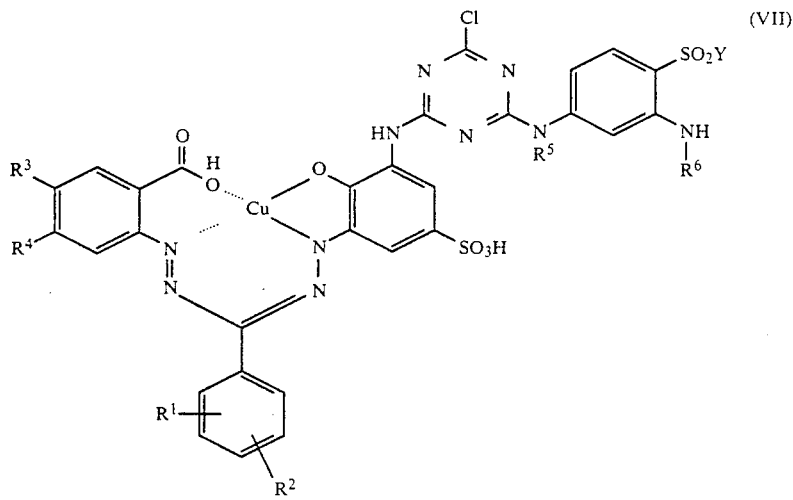

where $R^1$, $R^2$, $R^3$, $R^4$, $R^5$, and $R^6$ and Y are each as defined above.

Reaction of the dye of the formula VII with a dichlorotriazine dye of the formula V other than the dye V already incorporated in dye VII gives the dye of the formula Ia according to the present invention.

Dyes of the formula Ib are obtained for example by reacting cyanuric fluoride with a copper formazan dye of the formula IV to form the difluorotriazine dye of the formula VIII

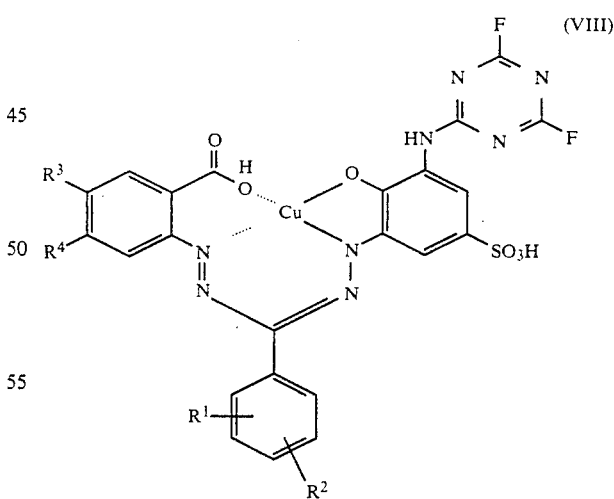

where $R^1$, $R^2$, $R^3$ and $R^4$ are each as defined above, which is then further reacted with a dye of the formula VII to form the dye of the formula Ib according to the present invention.

It is also possible to prepare dyes of the formula Ib by first reacting the diamine of the formula VI with the difluorotriazine dye of the formula VIII to form a dye of the formula IX

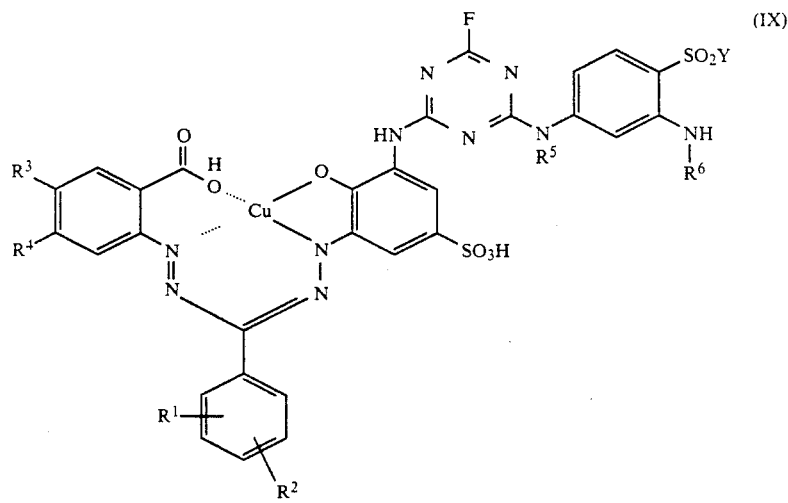

(IX)

where $R^1$, $R^2$, $R^3$, $R^4$, $R^5$, $R^6$ and Y are each as defined above, and then reacting this dye with the dye of the formula V.

Copper formazan reactive dyes of the formula Id

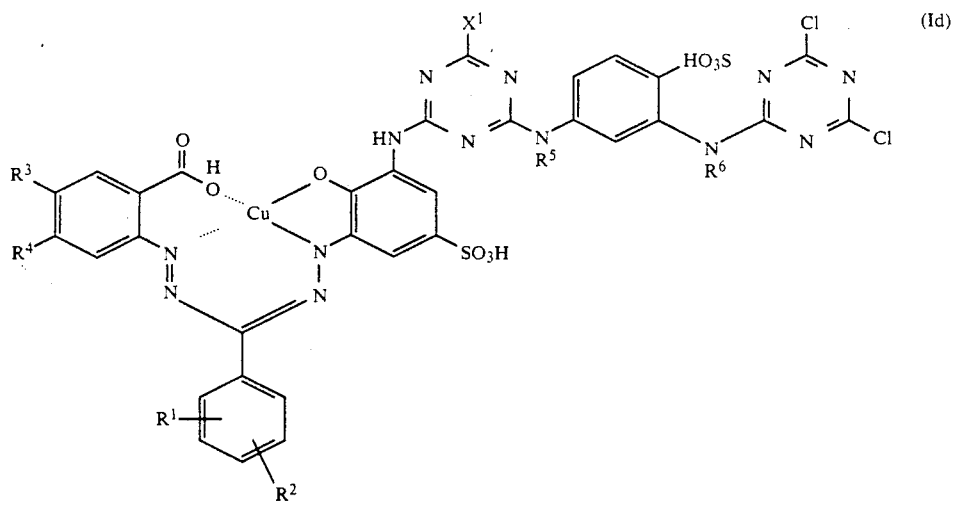

(Id)

where $R^1$, $R^2$, $R^3$, $R^4$, $R^5$, $R^6$ and $X^1$ are each as defined above, are obtained for example by reacting cyanuric chloride with dyes of the formula VIII or IX.

Copper formazan reactive dyes of the formula Ic are obtained for example by reacting an amine of the formula X

(X)

where $R^9$ and $R^{10}$ are each as defined above, with a dye of the formula Id or, alternatively, by reacting an amine of the formula X with cyanuric fluoride to form initially a difluorotriazine of the formula XI

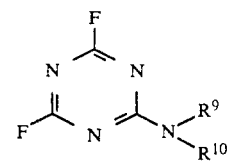

(XI)

where $R^9$ and $R^{10}$ are each as defined above, which is then subjected to a further reaction with a dye of the formula VIII or IX.

Copper formazan reactive dyes of the formula Ie are obtained for example by reacting a dichlorotriazine dye of the formula Id with a copper formazan dye of the formula VII or IX. However, it is also possible to prepare the dye of the formula Ie according to the present invention by reaction of the monochlorotriazine dye of the formula VII or of the monofluorotriazine dye of the formula IX with cyanuric fluoride to form initially a double attachment dye of the formula XII

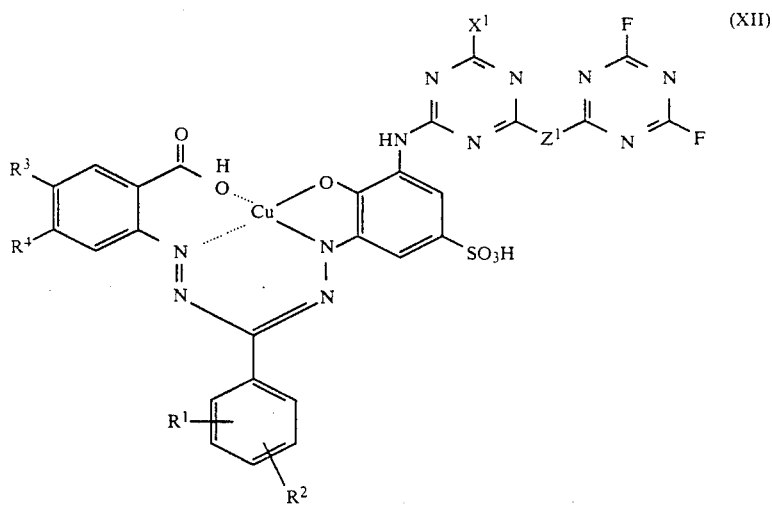

where $R^1$, $R^2$, $R^3$, $R^4$, $X^1$ and $Z^1$ are each as defined above, and further reaction of the double attachment dye of the formula XII with a dye of the formula VII or IX.

A further possible way of synthesizing dyes of the formula Ie consists in reacting a diamine of the formula VI with a dye of the formula Id or XII to form a dye of the formula XIV

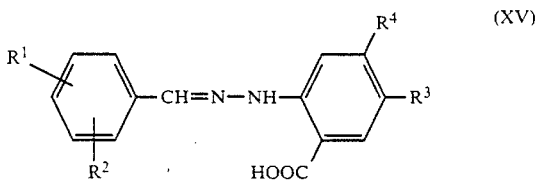

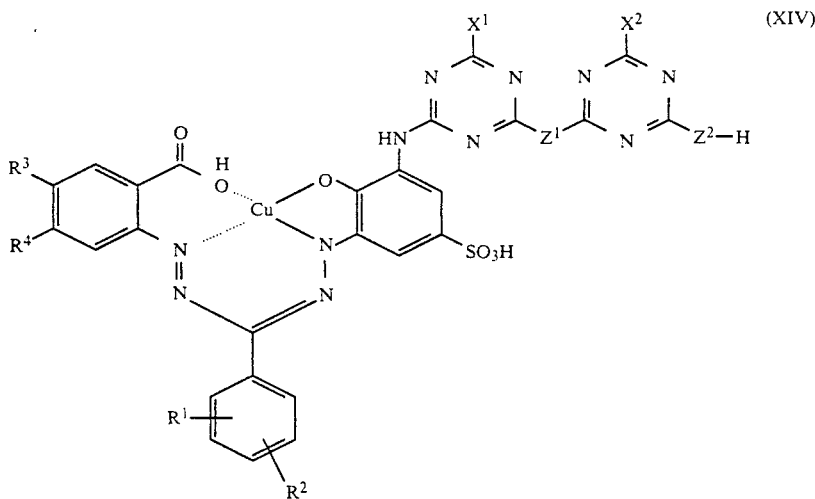

where $R^1$, $R^2$, $R^3$, $R^4$, $Z^1$, $Z^2$, $X^1$ and $X^2$ are each as defined above, and further reacting the product with a dichlorotriazine dye of the formula V or a difluorotriazine dye of the formula VIII.

The copper formazan dye parent to the radical of the formula II (in the parent, the —NH— group in the formula II is saturated by hydrogen) can likewise be prepared in a conventional manner. It is obtained for example by coupling the diazonium salt of 1-hydroxy-2-amino-6-acetylaminobenzene-4-sulfonic acid with a phenylhydrazone of the formula XV where $R^1$, $R^2$, $R^3$ and $R^4$ are each as defined above, then complexing the reaction product with copper by reaction with copper sulfate or copper chloride, and finally converting the acetylamino group into the free amino group by hydrolysis (cf. Houben-Weyl, Methoden der Organischen Chemie, Volume 10/2, pages 487 and 480, 1967).

Further preparation details may be found in the Examples.

The novel copper formazan reactive dyes of the formual I are suitable for dyeing and printing hydroxyl- or nitrogen-containing organic substrates. Such substrates are for example leather and fiber material which predominantly contains natural or synthetic polyamides or natural or regenerated cellulose. The novel dyes are preferably suitable for dyeing and printing textile material based on cotton. They are particularly advantageously applied to cotton by the exhaust method.

The dyes according to the present invention produce dyeings in medium blue shades. They are readily soluble and have a very high fastness level, in particular wet fastness. The color buildup in medium to deep dyeings is particularly high.

The following Examples will illustrate the invention in more detail:

EXAMPLE 1

19.5 g of cyanuric chloride were added to a solution of 62 g of the sodium salt of the compound of the formula

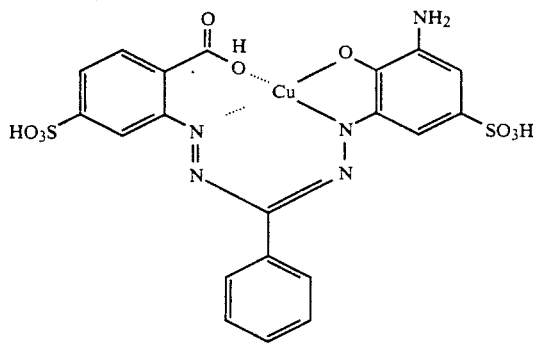

in 150 ml of water and 150 g of ice. The pH of the reaction mixture was maintained at 5–5.5 with sodium bicarbonate until the acylation had ended. After 2 hours, 19 g of 4-amino-2-(N-methylamino)benzenesulfonic acid, dissolved in 200 ml of water, were added. The suspension was heated to 40° C., and the pH was maintained at 7–8 by the addition of sodium bicarbonate.

After 6 hours, the resulting dye of the formula

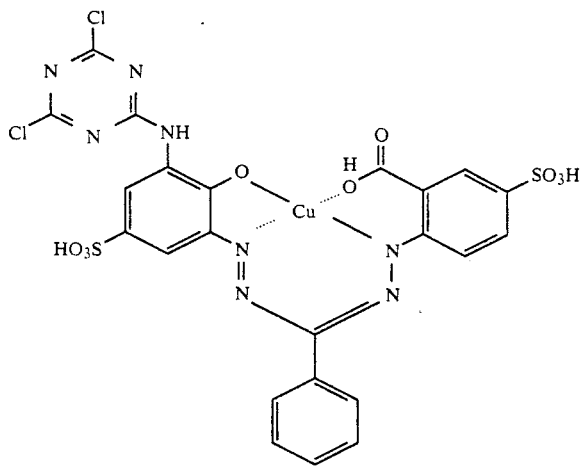

formed, as described above, by reaction of 62 g of the sodium salt of the compound of the formula

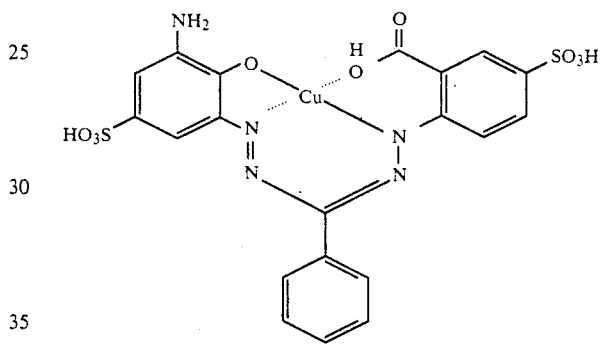

with 19.5 g of cyanuric chloride. The suspension was heated to 60° C., and the pH was maintained at 7–7.5 by the addition of sodium bicarbonate. After 6 hours, the resulting dye of the formula

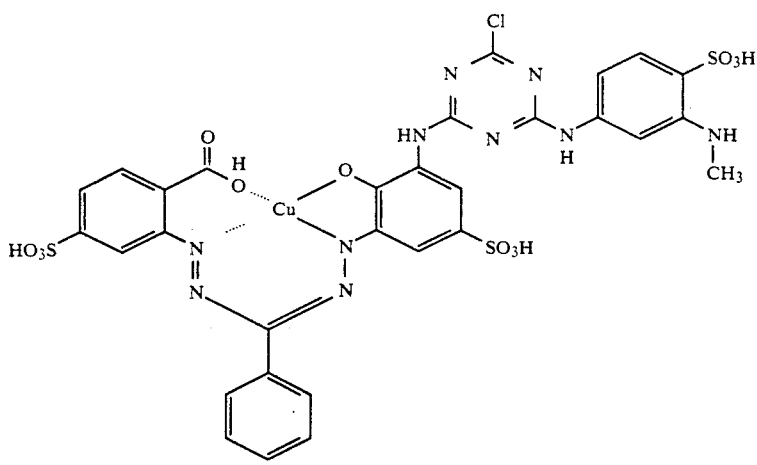

was admixed in solution with 78 g of the dichlorotriazine dye of the formula

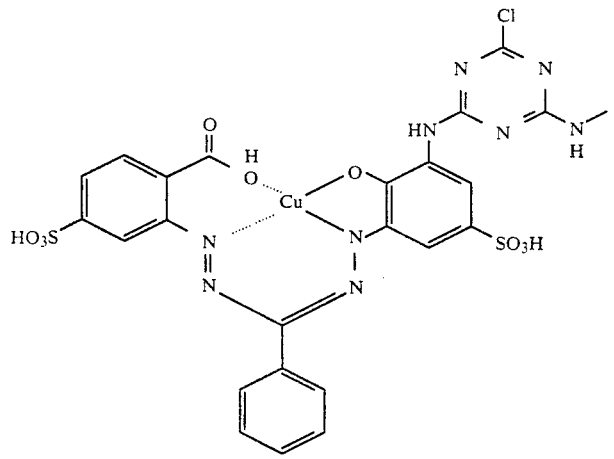

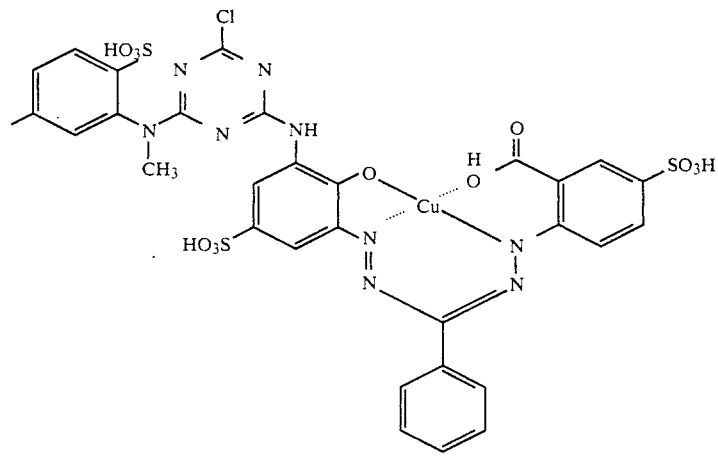

was salted out with sodium chloride in the form of its sodium salt, filtered off and dried. The dark blue powder obtained is very readily water-soluble and dyes cotton in bright blue shades. The dyeings are light- and wet-fast. They show remarkable stability to oxidative influences.

The method of Example 1 was used to obtain the dyes indicated in Table 1, which dye cotton in fast brilliant medium blue shades.

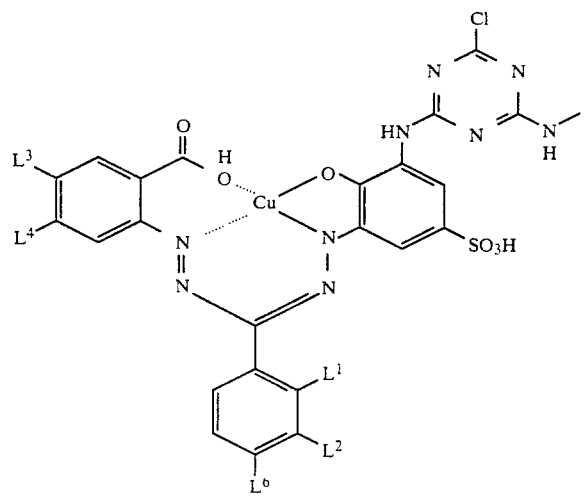

-continued

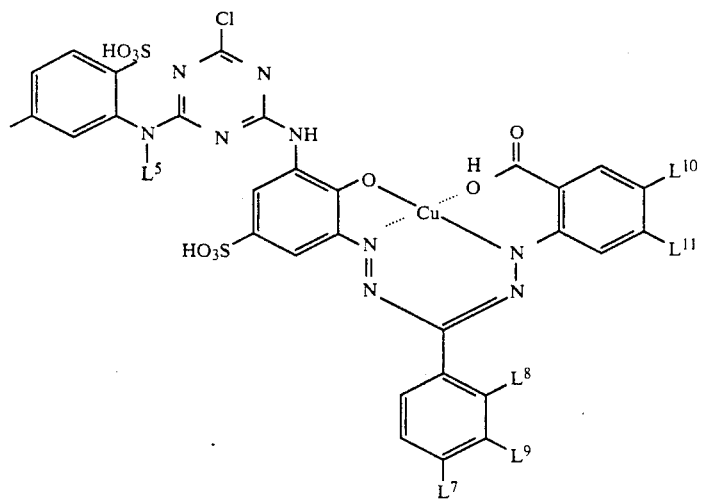

TABLE 1

| Ex. No. | L¹ | L² | L³ | L⁴ | L⁵ | L⁶ | L⁷ | L⁸ | L⁹ | L¹⁰ | L¹¹ |
|---|---|---|---|---|---|---|---|---|---|---|---|
| 2 | H | H | H | SO₃H | Et | H | H | H | H | SO₃H | H |
| 3 | H | H | SO₃H | H | Me | H | H | H | H | H | SO₃H |
| 4 | H | H | SO₃H | H | Et | H | H | H | H | H | SO₃H |
| 5 | H | H | SO₃H | H | Me | H | H | SO₃H | H | H | SO₃H |
| 6 | H | H | SO₃H | H | Me | H | H | SO₃H | H | SO₃H | H |
| 7 | SO₃H | H | SO₃H | H | Me | H | H | H | H | SO₃H | H |
| 8 | SO₃H | H | SO₃H | H | Me | H | H | H | H | H | SO₃H |
| 9 | SO₃H | H | SO₃H | H | Me | H | H | SO₃H | H | H | SO₃H |
| 10 | SO₃H | H | SO₃H | H | Me | H | H | SO₃H | H | H | H |
| 11 | SO₃H | H | SO₃H | H | Me | H | H | H | SO₃H | H | H |
| 12 | SO₃H | H | SO₃H | H | Me | H | SO₃H | H | H | H | H |
| 13 | H | SO₃H | H | H | Me | H | H | SO₃H | H | H | SO₃H |
| 14 | SO₃H | H | H | H | Me | SO₃H | H | H | H | H | H |
| 15 | H | H | H | SO₃H | Me | H | H | SO₃H | H | SO₃H | H |
| 16 | SO₃H | H | H | SO₃H | Me | H | H | H | H | SO₃H | H |
| 17 | SO₃H | H | H | SO₃H | Me | H | H | SO₃H | H | SO₃H | H |
| 18 | H | H | H | SO₃H | Me | H | H | SO₃H | H | H | SO₃H |
| 19 | SO₃H | H | H | SO₃H | Me | H | H | H | H | H | H |

EXAMPLE 20

14 g of trifluorotriazine were added dropwise into a solution of 62 g of the sodium salt of the compound of the formula

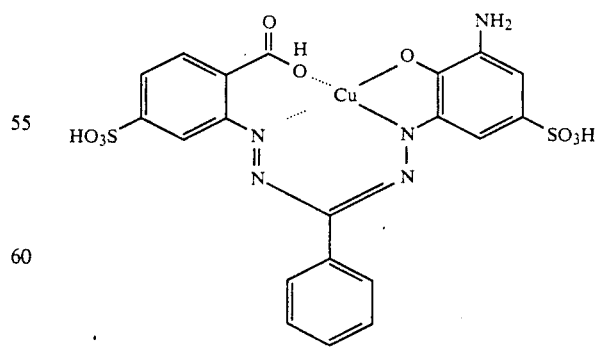

in 150 ml of water and 150 g of ice at 0° C. in the course of 30 minutes, and the pH was maintained between 4.9 and 5.2. After 30 minutes, 95.5 g of the sodium salt of the dye of the formula

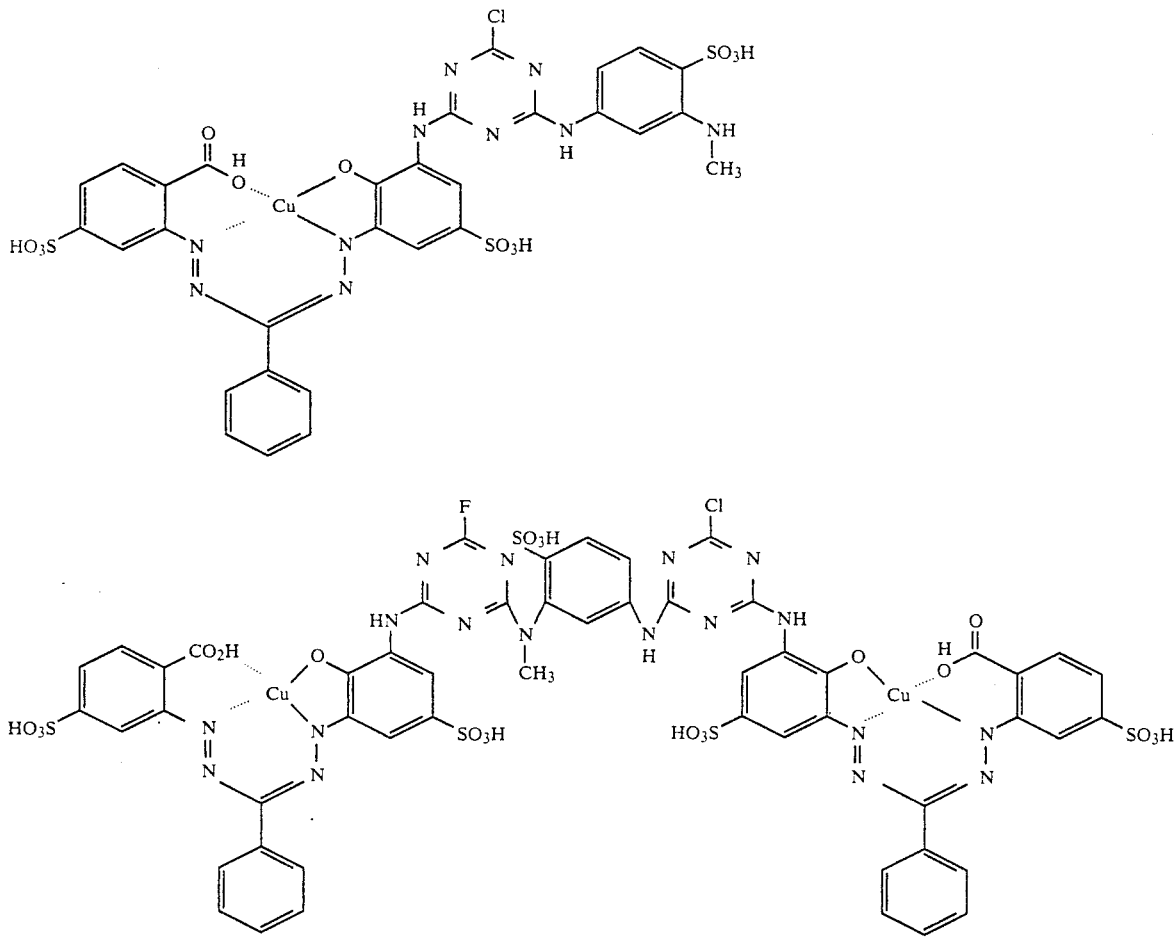

obtained similarly to the method described in Example 1, were added, and pH 6.5-7 was maintained at 15° C. for 6 hours by the addition of sodium bicarbonate. Thereafter the resulting dye of the formula

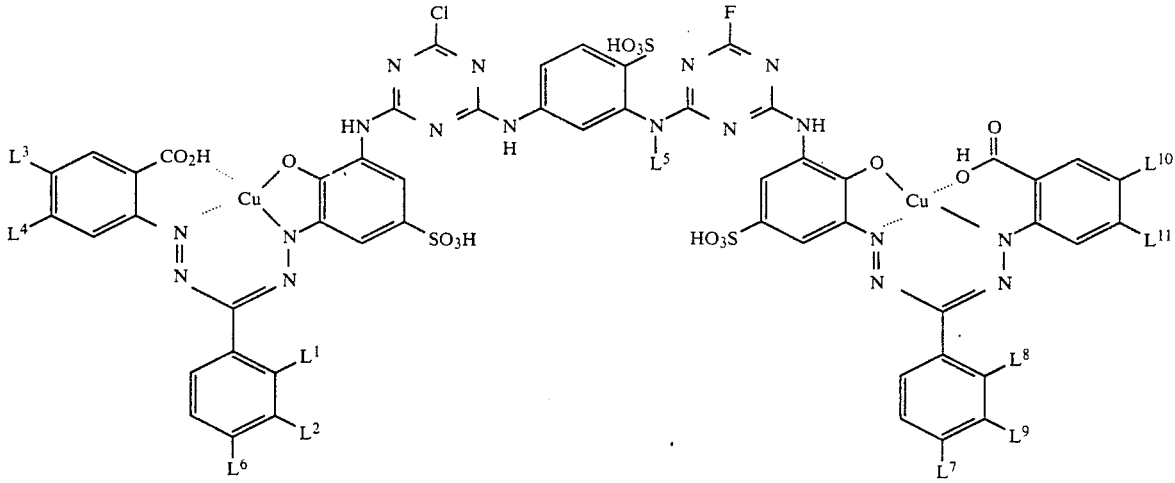

was salted out with sodium chloride in the form of its sodium salt, filtered off and dried. The dark blue dye powder obtained is very readily water-soluble and dyes cotton in bright blue shades. The dyeings are light- and wet-fast. They show remarkable stability to oxidative influences.

The method of Example 20 was used to obtain the dyes indicated in Table 2, which dye cotton in fast brilliant medium blue shades.

TABLE 2

| Ex. No. | L¹ | L² | L³ | L⁴ | L⁵ | L⁶ | L⁷ | L⁸ | L⁹ | L¹⁰ | L¹¹ |
|---|---|---|---|---|---|---|---|---|---|---|---|
| 21 | SO₃H | H | H | SO₃H | Me | H | SO₃H | H | H | SO₃H | H |
| 22 | SO₃H | H | SO₃H | H | Me | H | SO₃H | H | SO₃H | H | SO₃H |
| 23 | H | H | SO₃H | H | Me | H | H | H | SO₃H | H | H |
| 24 | H | H | SO₃H | H | Et | H | H | H | SO₃H | H | H |
| 25 | H | H | H | SO₃H | Et | H | H | H | H | SO₃H | H |
| 26 | H | H | H | SO₃H | Et | H | H | H | SO₃H | H | H |
| 27 | H | H | SO₃H | H | Me | H | H | H | H | H | SO₃H |
| 28 | H | H | SO₃H | H | Et | H | H | H | H | H | SO₃H |
| 29 | H | H | SO₃H | H | Me | H | H | SO₃H | H | H | SO₃H |
| 30 | H | H | SO₃H | H | Me | H | H | SO₃H | H | SO₃H | H |
| 31 | SO₃H | H | SO₃H | H | Me | H | H | H | H | SO₃H | H |
| 32 | SO₃H | H | SO₃H | H | Me | H | H | H | H | H | SO₃H |
| 33 | SO₃H | H | SO₃H | H | Me | H | H | SO₃H | H | H | SO₃H |
| 34 | SO₃H | H | SO₃H | H | Me | H | H | SO₃H | H | H | H |
| 35 | SO₃H | H | SO₃H | H | Me | H | H | H | SO₃H | H | H |
| 36 | SO₃H | H | SO₃H | H | Me | H | SO₃H | H | H | H | H |
| 37 | H | SO₃H | H | H | Me | H | H | SO₃H | H | H | SO₃H |
| 38 | SO₃H | H | H | H | Me | SO₃H | H | H | H | H | H |
| 39 | H | H | H | SO₃H | Me | H | H | SO₃H | H | SO₃H | H |
| 40 | SO₃H | H | H | SO₃H | Me | H | H | H | H | SO₃H | H |
| 41 | SO₃H | H | H | SO₃H | Me | H | H | SO₃H | H | SO₃H | H |
| 42 | H | H | H | SO₃H | Me | H | H | SO₃H | H | H | SO₃H |
| 43 | SO₃H | H | H | SO₃H | Me | H | H | H | H | H | H |

EXAMPLE 44

19.5 g of cyanuric chloride were added to a solution of 95.5 g of the sodium salt of the dye of the formula

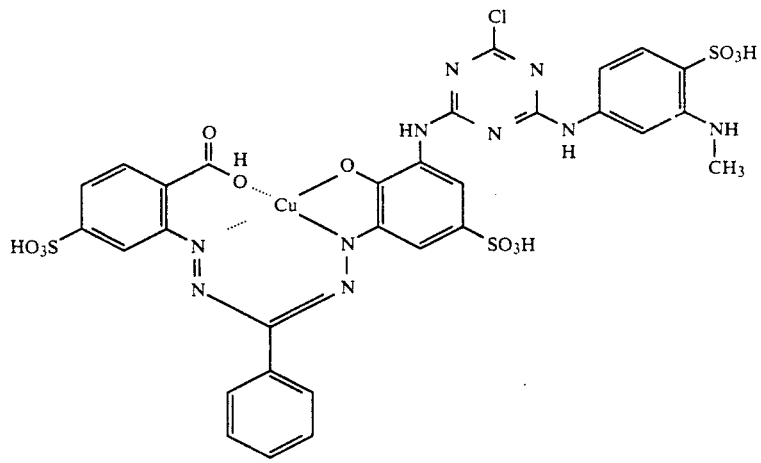

obtained as described in Example 1, in 150 ml of water and 150 g of ice at 0° C. The pH of the reaction mixture was maintained at 5–5.5 with sodium bicarbonate until the acylation had ended. After 3 hours at 5° C. the resulting dye of the formula

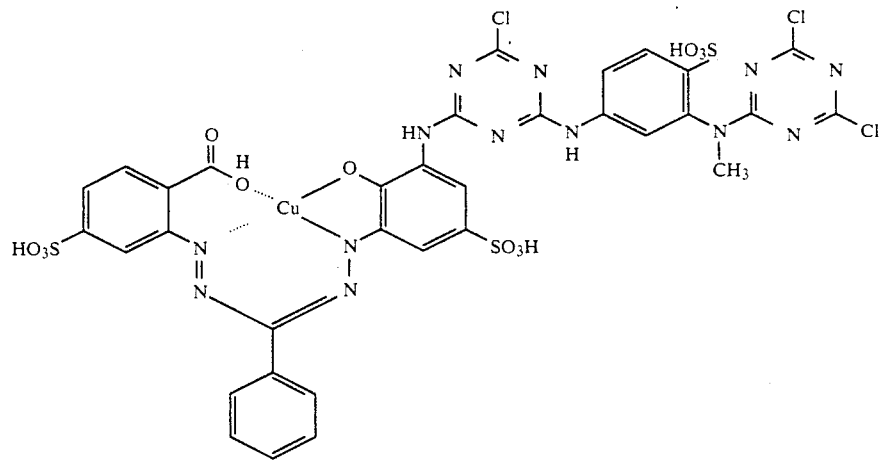

was filtered off and dried. The dark blue dye powder obtained is very readily water-soluble and dyes cotton in bright blue shades. The dyeings are light- and wet-fast. They show remarkable stability to oxidative influences.

The method of Example 44 was used to obtain the dyes indicated in Table 3, which dye cotton in fast brilliant medium blue shades.

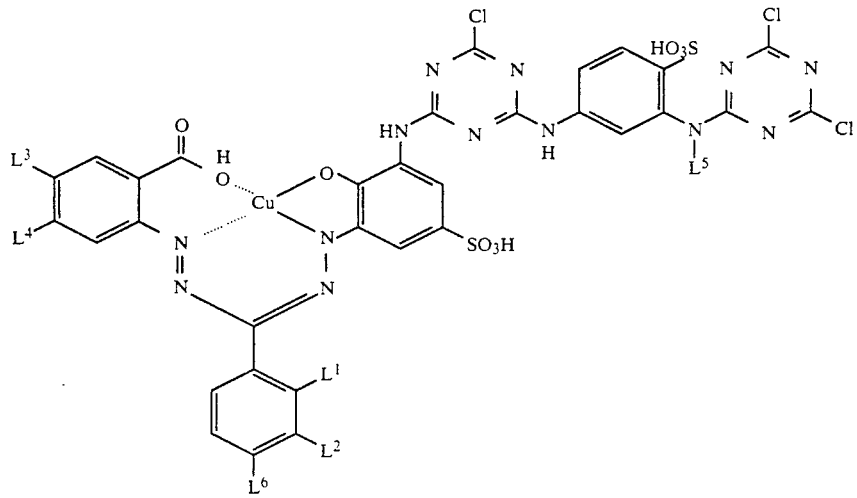

TABLE 3

| Ex. No. | L¹ | L² | L³ | L⁴ | L⁵ | L⁶ |
|---|---|---|---|---|---|---|
| 45 | H | H | H | SO₃H | Et | H |
| 46 | H | H | SO₃H | H | Me | H |
| 47 | H | H | SO₃H | H | Et | H |
| 48 | SO₃H | H | SO₃H | H | Me | H |
| 49 | SO₃H | H | H | SO₃H | Me | H |
| 50 | H | SO₃H | H | SO₃H | Me | H |
| 51 | SO₃H | H | H | H | Me | H |
| 52 | SO₃H | H | H | H | Me | SO₃H |

EXAMPLE 53

18 g of 3-aminobenzenesulfonic acid were added at 20° C. to a solution of 111.5 g of the sodium salt of the dye of the formula

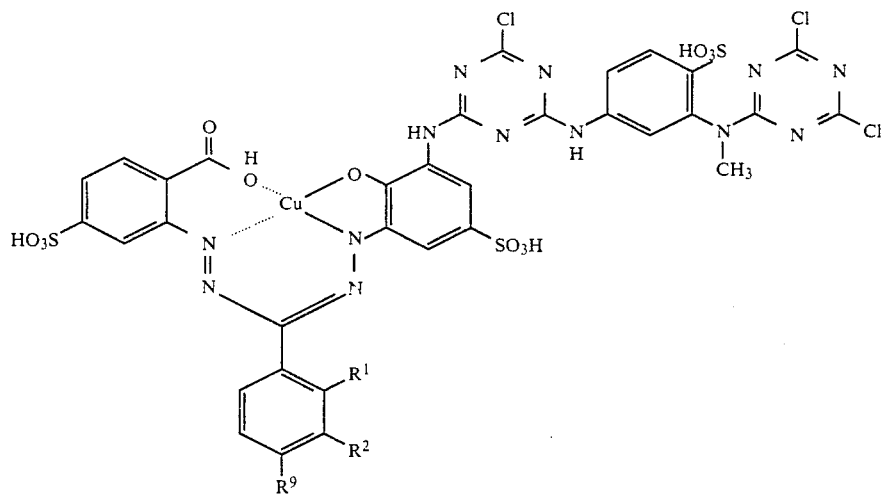

obtained as described in Example 44, in 300 ml of water, and the mixture was stirred at 40° C. for 3 hours, during which pH 6.5-7.5 was maintained by the addition of sodium bicarbonate. Thereafter the resulting dye of the formula

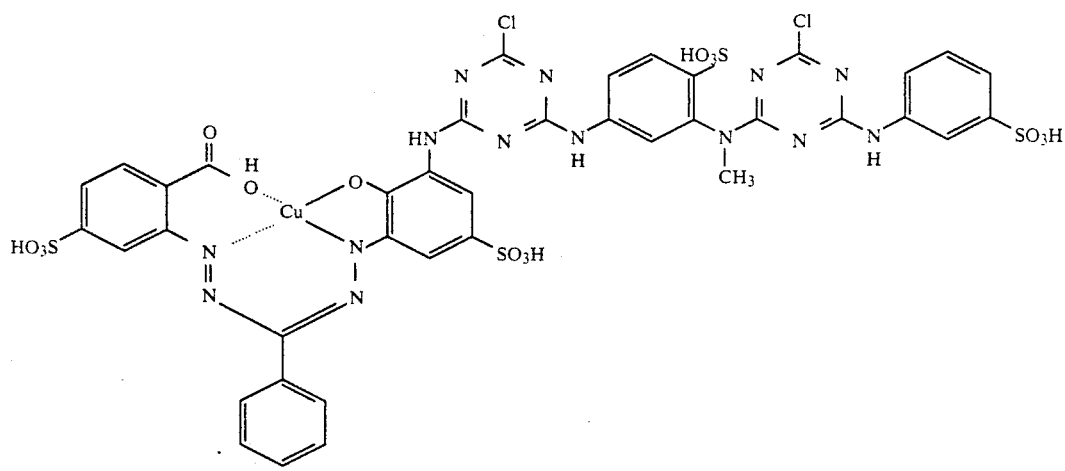

was salted out with sodium chloride in the form of its sodium salt, filtered off and dried. The dark blue dye powder obtained is very readily water-soluble and dyes cotton in bright blue shades. The dyeings are light- and wet-fast. They show remarkable stability to oxidative influences.

The method of Example 53 was used to obtain the dyes indicated in Table 4, which dye cotton in fast brilliant medium blue shades.

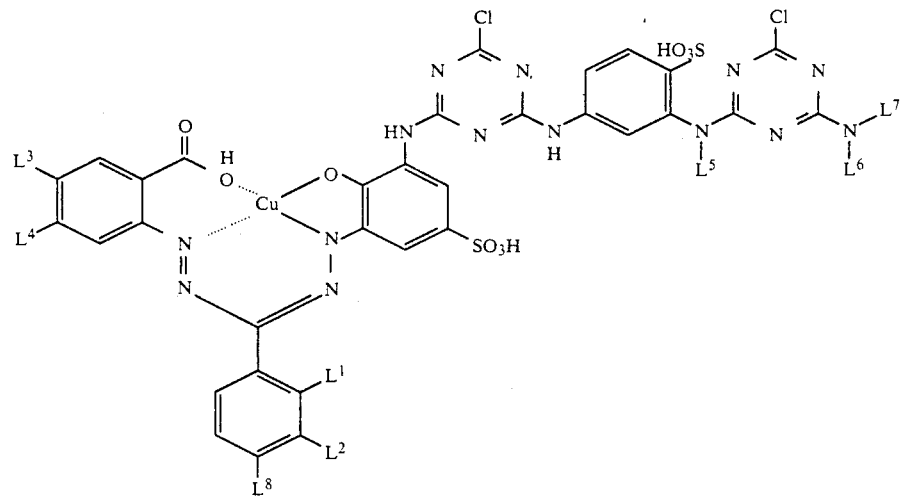

| Ex. No. | $L^1$ | $L^2$ | $L^3$ | $L^4$ | $L^5$ | $L^6$ | $L^7$ | $L^8$ |
|---|---|---|---|---|---|---|---|---|
| 54 | H | H | H | $SO_3H$ | Et | H | -C₆H₄-$SO_3H$ (m) | H |
| 55 | H | H | H | $SO_3H$ | Me | H | -C₆H₃($SO_3H$)(Cl) | H |
| 56 | H | H | H | $SO_3H$ | Me | H | -C₆H₃($SO_3H$)($CH_3$) | H |

TABLE 4-continued

| Ex. No. | L¹ | L² | L³ | L⁴ | L⁵ | L⁶ | L⁷ | L⁸ |
|---|---|---|---|---|---|---|---|---|
| 57 | H | H | SO₃H | H | Me | H | m-SO₃H-phenyl | H |
| 58 | H | H | H | SO₃H | Me | H | H | H |
| 59 | H | H | H | SO₃H | Et | H | H | H |
| 60 | H | H | H | SO₃H | Me | Me | phenyl | H |
| 61 | H | H | H | SO₃H | Et | Me | phenyl | H |
| 62 | H | H | H | SO₃H | Me | Et | phenyl | H |
| 63 | H | H | SO₃H | H | Me | Me | phenyl | H |
| 64 | H | H | SO₃H | H | Me | H | H | H |
| 65 | H | H | SO₃H | H | Me | Et | H | H |
| 66 | SO₃H | H | SO₃H | SO₃H | Et | H | H | Me |
| 67 | SO₃H | H | H | SO₃H | Me | H | H | H |
| 68 | SO₃H | H | H | SO₃H | Me | H | H | H |
| 69 | SO₃H | H | H | H | Me | H | H | SO₃H |
| 70 | H | SO₃H | H | SO₃H | Me | H | H | H |

EXAMPLE 71

95.5 g of the sodium salt of the dye of the formula obtained as described in Example 1, were added to a solution of 111.5 g of the sodium salt of the dye of the formula

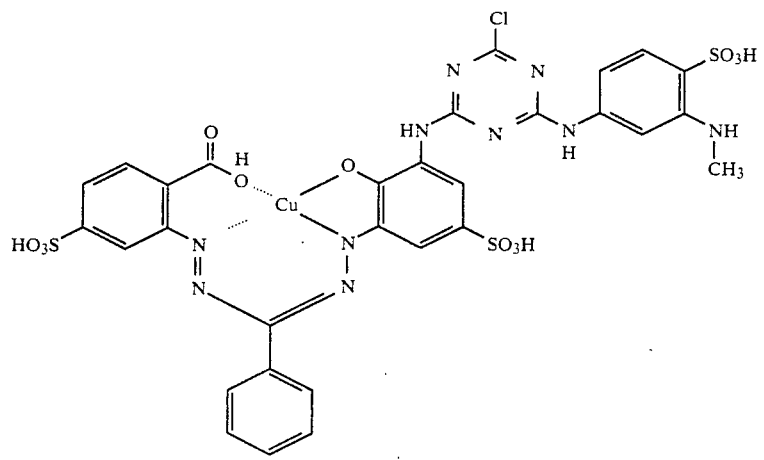

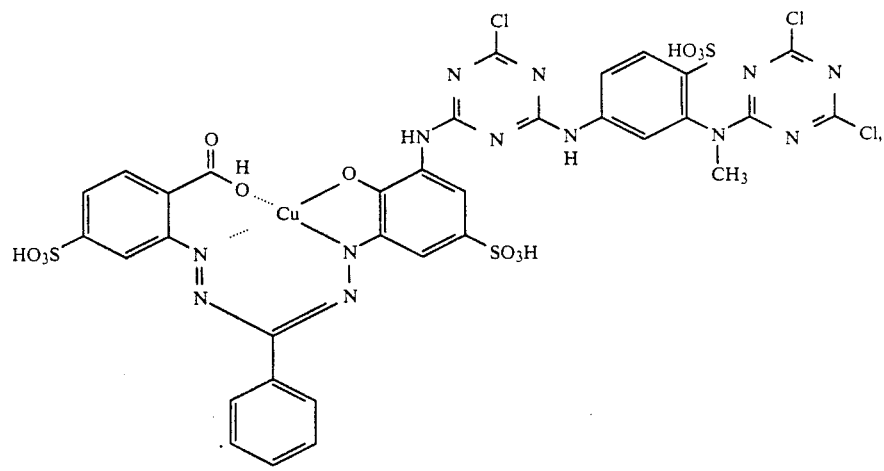

obtained as described in Example 44, in 1000 ml of water, and at 60° C. the suspension was maintained at pH 6.5–7.0 by the addition of sodium bicarbonate. After 6 hours the resulting dye of the formula cotton in bright blue shades. The dyeings are light- and wet-fast. They show remarkable stability to oxidative influences.

The method of Example 71 was used to obtain the

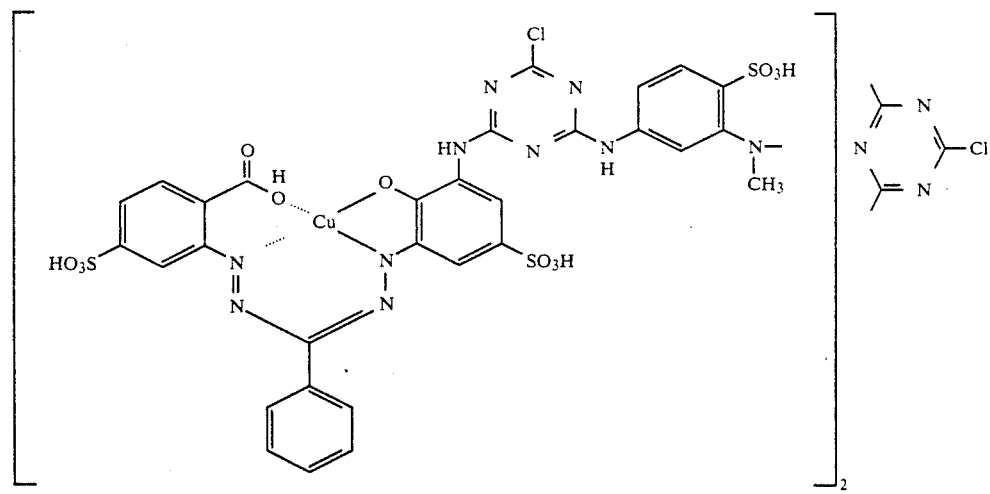

was salted out with sodium chloride in the form of its sodium salt, filtered off and dried. The dark blue dye powder obtained is very readily water-soluble and dyes dyes indicated in Table 5 which dye cotton in fast brilliant medium blue shades.

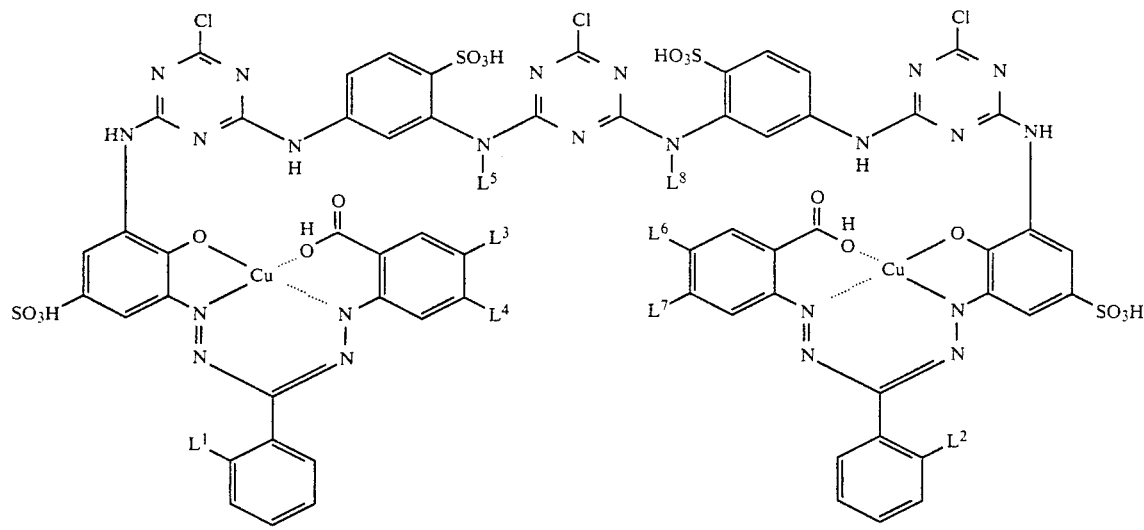

TABLE 5

| Ex. No. | $L^1$ | $L^2$ | $L^3$ | $L^4$ | $L^5$ | $L^6$ | $L^7$ | $L^8$ |
|---|---|---|---|---|---|---|---|---|
| 72 | H | SO$_3$H | H | H | Me | SO$_3$H | H | Me |
| 73 | H | SO$_3$H | H | H | Me | H | SO$_3$H | Me |
| 74 | H | SO$_3$H | H | H | Me | SO$_3$H | H | Et |
| 75 | H | SO$_3$H | H | H | Me | H | SO$_3$H | Et |
| 76 | H | H | SO$_3$H | H | Me | SO$_3$H | H | Et |
| 77 | H | H | SO$_3$H | H | Me | H | SO$_3$H | Et |
| 78 | H | H | SO$_3$H | H | Et | H | SO$_3$H | Et |
| 79 | SO$_3$H | H | SO$_3$H | H | Me | H | SO$_3$H | Me |
| 80 | SO$_3$H | SO$_3$H | H | H | Me | SO$_3$H | H | Me |
| 81 | SO$_3$H | SO$_3$H | H | SO$_3$H | Me | SO$_3$H | H | Me |

EXAMPLE 82

14 g of trifluorotriazine were added dropwise to a solution of 70 g of the sodium salt of the compound of the formula

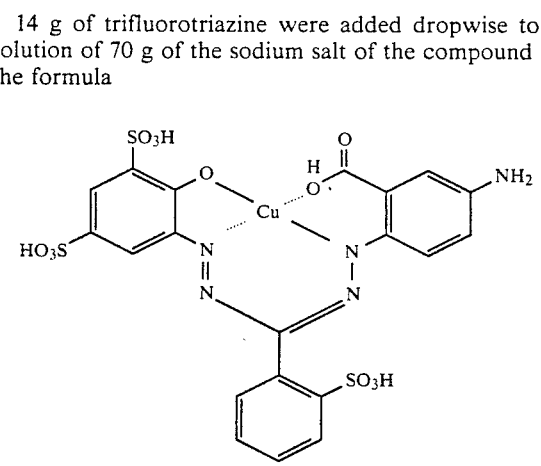

in 150 ml of water and 150 g of ice at 0° C. in the course of 30 minutes, and pH 4.9–5.2 was maintained. After 30 minutes, 20 g of 3-(N-methylamino)-4-hydroxysulfonylaniline were added, and pH 6.5–7.0 was maintained with sodium bicarbonate. After 30 minutes, 78 g of the dichlorotriazine dye of the formula

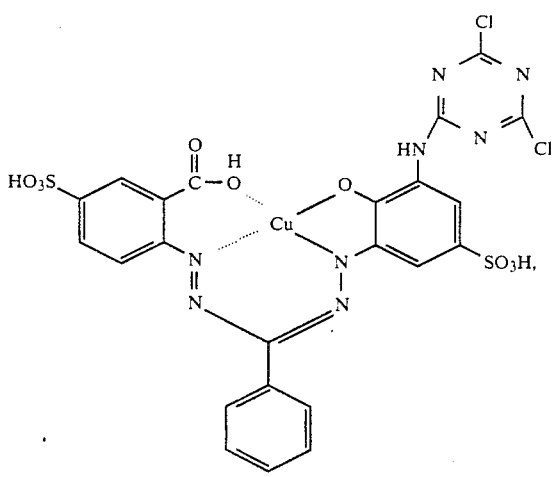

obtained as described in Example 1, were added, and pH 7–7.5 was maintained with sodium bicarbonate. After 6 hours, the resulting dye of the formula

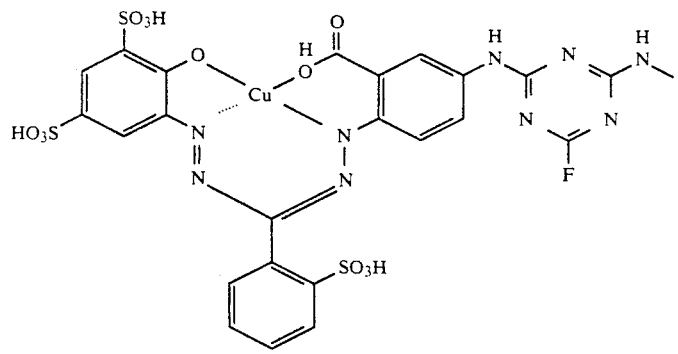

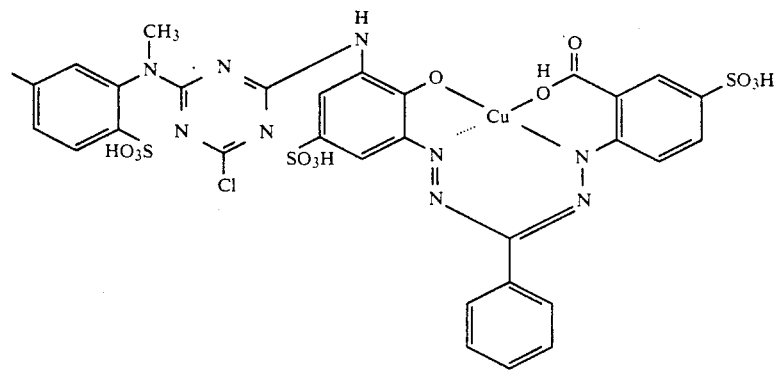

35 was salted out with sodium chloride in the form of its sodium salt, filtered off and dried. The dark blue dye powder obtained is very readily water-soluble and dyes cotton in bright blue shades. The dyeings are light- and wet-fast. They show remarkable stability to oxidative influences.

The method of Example 82 was used to obtain the dyes indicated in Table 6, which dye cotton in fast brilliant medium blue shades.

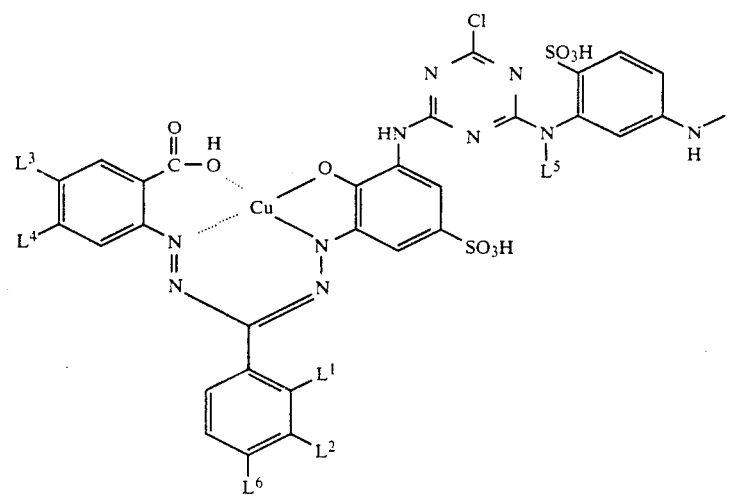

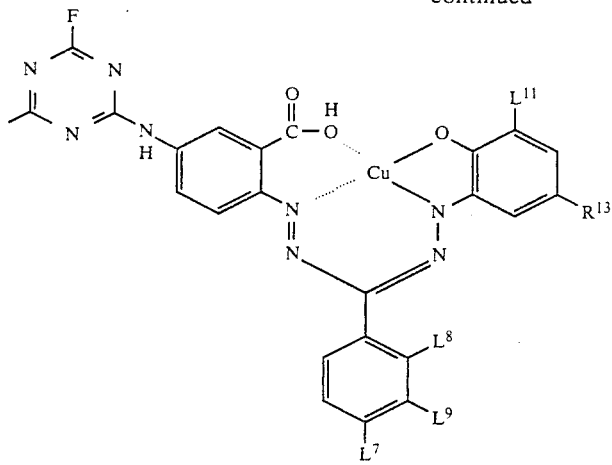

TABLE 6

| Ex. No. | L¹ | L² | L³ | L⁴ | L⁵ | L⁶ | L⁷ | L⁸ | L⁹ | L¹⁰ | L¹¹ |
|---|---|---|---|---|---|---|---|---|---|---|---|
| 83 | H | H | H | SO₃H | CH₃ | H | H | SO₃H | H | SO₃H | SO₃H |
| 84 | H | H | H | SO₃H | C₂H₅ | H | H | SO₃H | H | SO₃H | SO₃H |
| 85 | SO₃H | H | H | SO₃H | CH₃ | H | H | SO₃H | H | SO₃H | H |
| 86 | SO₃H | H | H | SO₃H | CH₃ | H | SO₃H | SO₃H | H | H | H |
| 87 | H | SO₃H | H | SO₃H | CH₃ | H | SO₃H | SO₃H | H | H | H |
| 88 | H | H | H | SO₃H | CH₃ | H | H | H | SO₃H | SO₃H | SO₃H |
| 89 | H | H | SO₃H | H | C₂H₅ | H | H | SO₃H | H | SO₃H | SO₃H |
| 90 | SO₃H | H | SO₃H | H | CH₃ | SO₃H | H | SO₃H | H | H | H |

19 g of trichlorotriazine were added to a solution of 10 g of the sodium salt of the compound of the formula in 150 g of water and 150 g of ice at 0° C. in the course of 30 minutes, and pH 4.9–5.2 was maintained. After 30 minutes, 95.5 g of the sodium salt of the dye of the formula

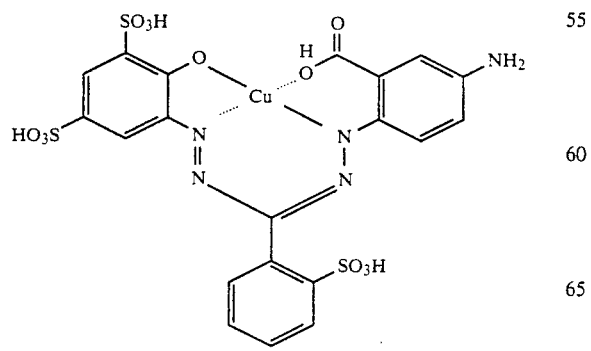

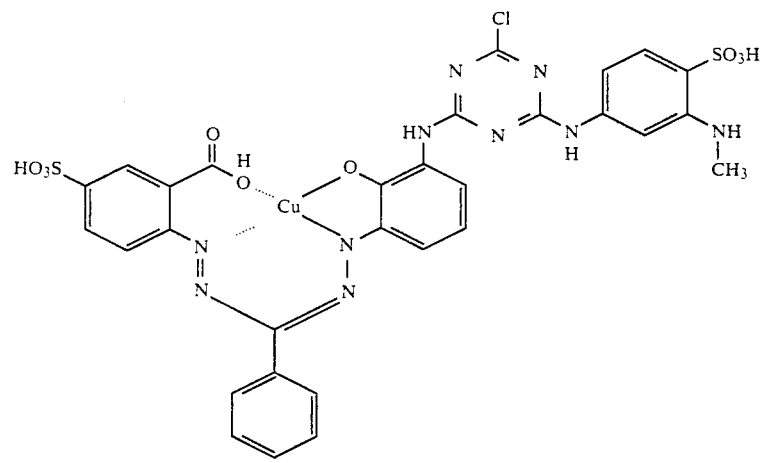

obtained by the method described in Example 1, were added, and pH 6.5–7 was maintained at 15° C. for 6 hours by the addition of NaHCO₃. Thereafter the resulting dye of the formula

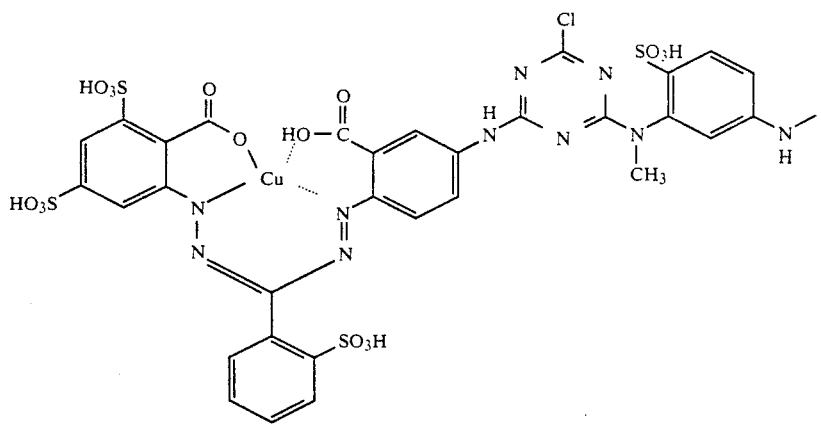

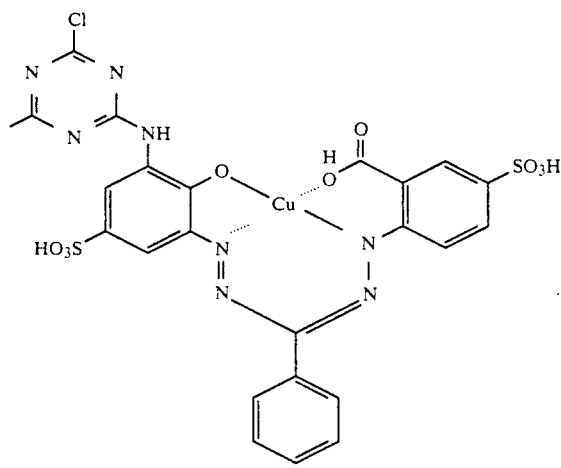

was salted out with sodium chloride in the form of its sodium salt, filtered off and dried. The dark blue dye powder obtained is very readily water-soluble and dyes cotton in bright blue shades. The dyeings are light- and wet-fast. They show remarkable stability to oxidative influences.

The method of Example 91 was used to obtain the dyes indicated in Table 7, which dye cotton in fast brilliant medium blue shades.

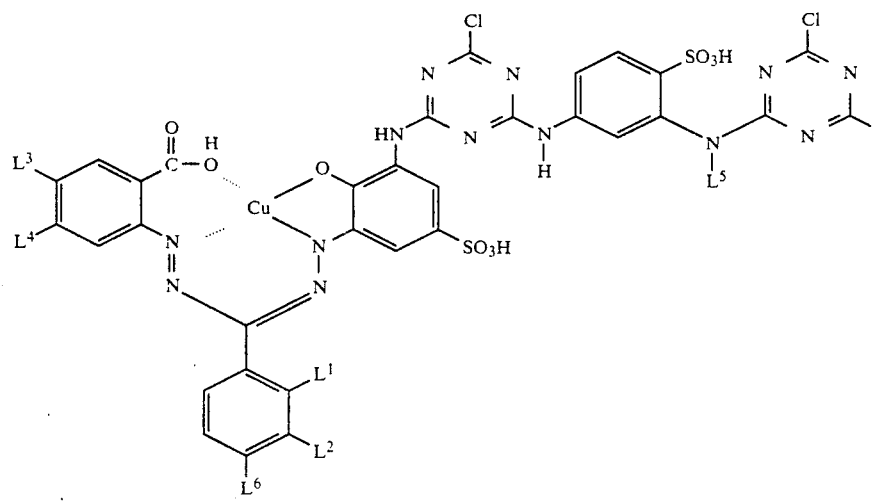

-continued

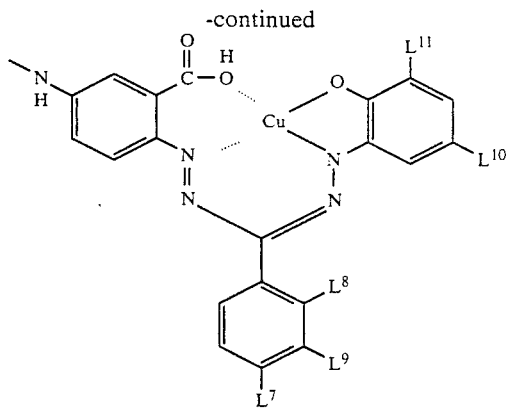

TABLE 7

| Ex. No. | $L^1$ | $L^2$ | $L^3$ | $L^4$ | $L^5$ | $L^6$ | $L^7$ | $L^8$ | $L^9$ | $L^{10}$ | $L^{11}$ |
|---|---|---|---|---|---|---|---|---|---|---|---|
| 92 | H | H | H | $SO_3H$ | $CH_3$ | H | H | $SO_3H$ | H | $SO_3H$ | $SO_3H$ |
| 93 | H | H | H | $SO_3H$ | $C_2H_5$ | H | H | $SO_3H$ | H | $SO_3H$ | $SO_3H$ |
| 94 | $SO_3H$ | H | H | $SO_3H$ | $CH_3$ | H | H | $SO_3H$ | H | $SO_3H$ | H |
| 95 | $SO_3H$ | H | H | $SO_3H$ | $CH_3$ | H | $SO_3H$ | $SO_3H$ | H | H | H |
| 96 | H | $SO_3H$ | H | $SO_3H$ | $CH_3$ | H | $SO_3H$ | $SO_3H$ | H | H | H |
| 97 | H | H | H | $SO_3H$ | $CH_3$ | H | H | H | $SO_3H$ | $SO_3H$ | $SO_3H$ |
| 98 | H | H | $SO_3H$ | H | $C_2H_5$ | H | H | $SO_3H$ | H | $SO_3H$ | $SO_3H$ |
| 99 | $SO_3H$ | H | $SO_3H$ | H | $CH_3$ | $SO_3H$ | H | $SO_3H$ | H | H | H |

We claim:

1. A copper formazan reactive dye of the formula (I):

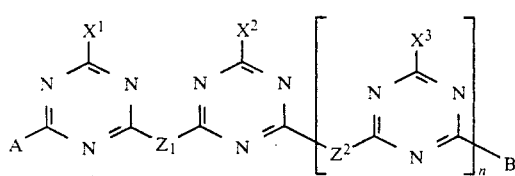

in the form of the free acid or in the form of a salt thereof, wherein n is 0 or 1, $X^1$ and $X^3$ are each chlorine, $X^2$ is chlorine, and A is a radical of the formula (IIa):

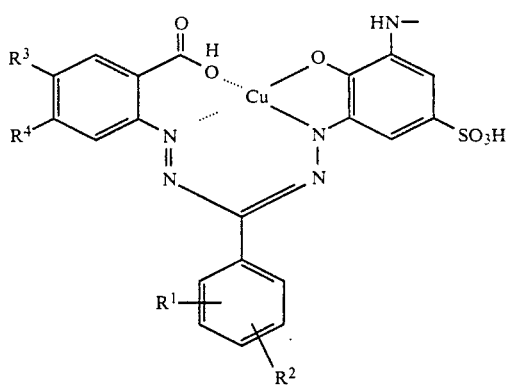

wherein $R^1$ is hydrogen, hydroxysulfonyl, $C_1$–$C_4$-alkoxy or chlorine, $R^2$ is hydrogen or hydroxysulfonyl, and one of the two radicals $R^3$ and $R^4$ is hydrogen and the other is hydroxysulfonyl, or when at least one of the two radicals $R^1$ and $R^2$ is hydroxysulfonyl, $R^3$ and $R^4$ are each simultaneously hydrogen or a radical of the formula (IIb):

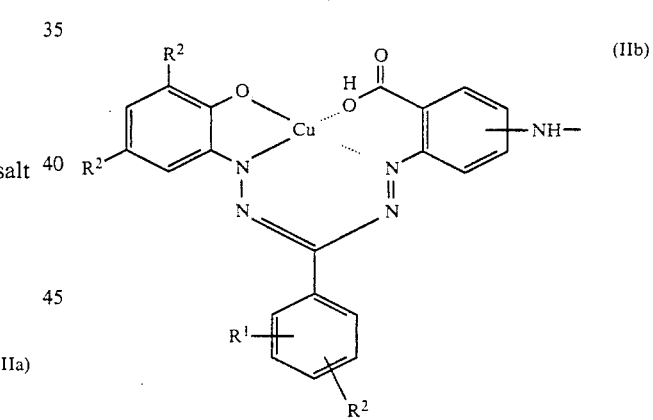

wherein $R^1$ and $R^2$ are each as defined above, $Z^1$ and $Z^2$ are identical or different, each being independently of the other a radical of the formula (III):

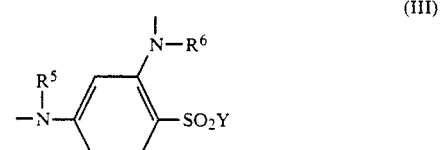

wherein $R^5$ and $R^6$ are identical or different, each being independently of the other hydrogen or unsubstituted or cyano- or hydroxyl-substituted $C_1$–$C_4$-alkyl, Y is hydroxyl or a radical of the formula $NR^7R^8$, wherein $R^7$ and $R^8$ are identical or different, each being independently of the other hydrogen or unsubstituted or cyano-, hydroxyl- or hydroxysulfonyl-substituted $C_1$–$C_4$-alkyl, where the radicals $R^7$ and $R^8$ together with a nitrogen atom joining them form a heterocyclic ring selected from the group consisting of pyrrolidino, piperidino, morpholino, piperazino and N-($C_1$–$C_4$-alkyl)piperazino, and B is a radical $NR^9R^{10}$, wherein $R^9$ and $R^{10}$ are identical or different, each being independently of the other hydrogen or unsubstituted or cyano-, hydroxyl-, or hydroxysulfonyl-substituted $C_1$–$C_4$-alkyl, or one of the two radicals $R^9$ and $R^{10}$ are phenyl which is unsubstituted or substituted by hydroxysulfonyl, sulfamoyl, $C_1$–$C_4$-alkyl, halogen, cyano or $C_1$–$C_4$-alkoxy, or B is as defined for the above-mentioned radical A, with the proviso that:
a) $R^5$ and $R^6$ are not both hydrogen,
b) when n is 0 and B is A, A and B are different, and
c) when n is 1, B is A.

2. The copper formazan reactive dye of claim 1, wherein Y and B are each selected from the group consisting of amino, mono- or dimethylamino, mono- or diethylamino, mono- or dipropylamino, mono- or diisopropylamino, mono- or dibutylamino, N-methyl-N-ethylamino, mono- or bis(2-cyanoethyl)amino, mono- or bis(2-hydroxyethyl)amino, N-ethyl-N-(2-cyanoethyl)amino, N-ethyl-N-(2-hydroxyehtyl)amino, 2-hydroxysulfonylethylamino or N-ethyl-N-(2-hydroxysulfonylethyl)-amino.

3. The copper formazan reactive dye of claim 1, wherein said salt is a lithium, sodium, potassium or ammonium salt.

4. The copper formazan reactive dye of claim 1, wherein $Z^1$ and $Z^2$ are each a radical of the formula (IIIa):

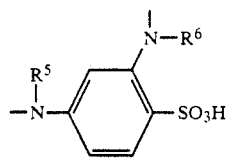

(IIIa)

wherein $R^5$ and $R^6$ are each independently of the other hydrogen, methyl or ethyl.

5. The copper formazan reactive dye of claim 1, wherein $Z^1$ and $Z^2$ are each a radical of the formula (IIIb):

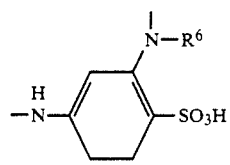

(IIIb)

wherein $R^6$ is methyl or ethyl.

6. The copper formazan reactive dye of claim 1, which has the formula (Ib):

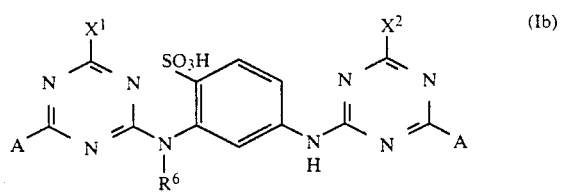

(Ib)

wherein $R^6$ is methyl or ethyl.

7. The copper formazan reactive dye of claim 1, which has the formula (Ic):

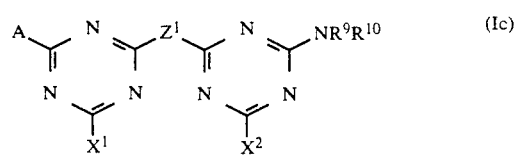

(Ic)

wherein $Z^1$ is a radical of the formula (IIIb):

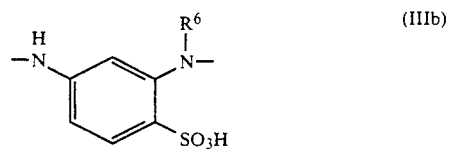

(IIIb)

wherein $R^6$ is methyl or ethyl.

8. The copper formazan reactive dye of claim 1, which has the formula (Id):

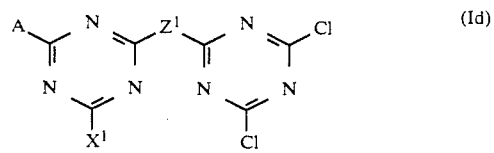

(Id)

wherein A is as defined above, $X^1$ is chlorine and Z is a radical of the formula (IIIb):

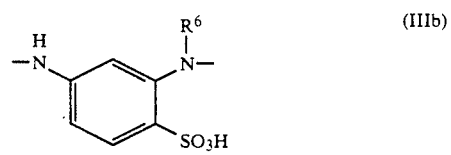

(IIIb)

wherein $R^6$ is methyl or ethyl.

9. A copper formazan reactive dye of the formula (Ie):

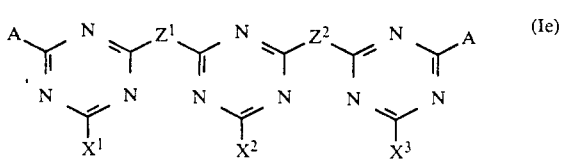

(Ie)

wherein A is a radical of the formula (IIa):

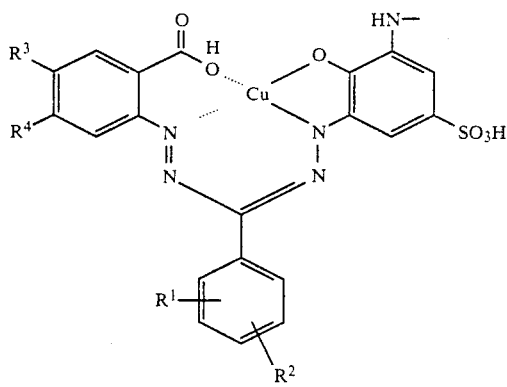
(IIa)

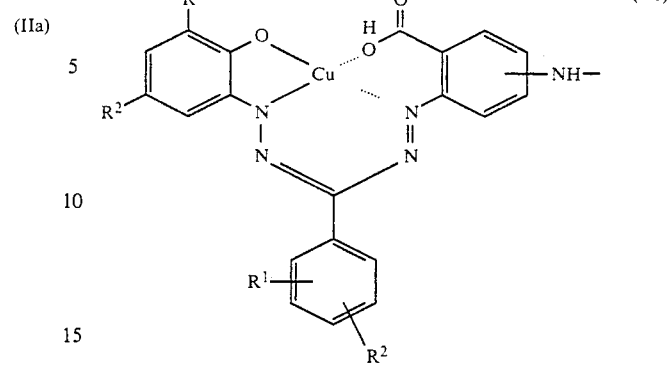
(IIb)

wherein

R¹ is hydrogen, hydroxysulfonyl, $C_1$–$C_4$-alkoxy or chlorine,

R² is hydrogen or hydroxysulfonyl, and one of the two radicals R³ and R⁴ is hydrogen and the other is hydroxysulfonyl, or when at least one of the two radicals R¹ and R² is hydroxysulfonyl, R³ and R⁴ are each simultaneously hydrogen or a radical of the formula (IIb):

wherein
R¹ and R² are each as defined above;
X¹, X² and X³ are each independently of the others chlorine or fluorine; and Z¹ and Z² are each independently of the other a radical of the formula (IIIb):

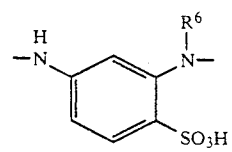
(IIIb)

wherein R⁶ is methyl or ethyl.

* * * * *